United States Patent Office 2,870,199
Patented Jan. 20, 1959

2,870,199

GENTISIC ACID PURIFICATION

Milton L. Clemens, Jr., Kingsport, Tenn., assignor to Eastman Kodak Company, Rochester, N. Y., a corporation of New Jersey No Drawing. Application October 1, 1956
Serial No. 612,988

3 Claims. (Cl. 260—521)

This invention relates to a method for the purification of gentisic acid. More particularly this invention concerns a purification method wherein the crude gentisic acid may be purified by procedure not primarily dependent on organic solvents.

Gentisic acid is a well-known chemical compound which is used for various purposes. The crude gentisic acid as prepared usually by the so-called Kolbe synthesis, characteristically has a yellow coloration due to certain impurities which are present. The poor color and impure nature of crude gentisic acid, as well as the desirability of purifying such product, has already been appreciated and methods for the purification suggested.

For example, in U. S. Patent 2,588,336 it was pointed out to the effect that gentisic acid is used for pharmaceutical purposes and it is therefore desirable to purify the crude acid. In order to accomplish this purification, the patentee proposes purifying the gentisic acid by an extraction process involving the use of an organic chemical such as diisopropyl ether. In Patent 2,588,679 the impure nature of crude gentisic acid is discussed and a solvent extraction method with an organic chemical is disclosed for purifying the crude acid.

While the prior art processes permit the production of a purified gentisic acid of light color, apparently such prior art procedures in addition to the extraction treatment with organic liquids, may still require several recrystallization steps in order to obtain a product entirely free from yellow coloration. Also, in some instances, one may not desire to employ substantial amounts of organic chemical liquids for purification of such acids.

It is apparent therefore that providing a new process for purifying gentisic acid, particularly a process not primarily dependent on the use of organic solvents, but one wherein a high quality, white product may be obtained in a relatively simple manner, represents a highly desirable result. After extended investigation I have found a method which I believe to be relatively simple and economical and which gives very excellent gentisic acid product, both as to color and purity.

This invention has for one object to provide a method for purifying crude gentisic acid. Another object is to provide a method which permits the production of gentisic acid of not only excellent purity but of a light color. Still a further object is to provide a method of processing crude gentisic acid which is not primarily dependent on the use of organic solvent chemicals in its operation. A still further object is to provide a method which is relatively simple and economical and which may be carried out wtih materials commonly available at chemical manufacturing plants. Other objects will appear hereinafter.

In the broader aspects of my invention I have found that crude gentisic acid dissolved in a suitable solution, such as in aqueous sodium hydroxide and preferably in the presence of a protective reducing agent such as zinc dust, may be treated with acetic anhydride or other similar esterifying agent. Such treatment converts the gentisic acid into an ester thereof or the ester salt which may be readily further processed as will be apparent from the description which follows:

That is, the soluble salt (sodium salt solution of gentisic acid monoacetate) may be readily processed with charcoal for decolorizing purposes, then treated with inorganic acid to release the insolubilized gentisic acid, and isolated, washed or otherwise processed. Preferably in carrying out such steps a small amount of zinc dust would be present.

In further detail, the insolubilized gentisic acid, as for example gentisic acid acetate, when acetic anhydride is used, may be treated, for example, with aqueous hydrochloric acid to hydrolyze the product and liberate gentisic acid. The gentisic acid in the hydrolysis environment may be further treated with decolorizing charcoal, then filtered or centrifuged to separate the charcoal and the gentisic acid isolated by crystallization. The product thus isolated and purified may, of course, be further washed with water and dried on standard equipment to give a white, high quality gentisic acid.

By my new procedure as just outlined, it is possible to accomplish separation of the less soluble gentisic acid acetate from a substantial portion of the colored impurities which remain dissolved in the aqueous solution from which the gentisic acid acetate is separated. I have noted that a substantial proportion of the yellow coloration of the crude product of gentisic acid prepared by the Kolbe synthesis is due, to a large extent, to minute amounts of 2,5-dihydroxy terephthalic acid which is present as an impurity. I have found that my method, which permits the use of aqueous media and conventional treating agents such as charcoal, very effectively and economically permits the purification of crude gentisic acid.

For a still further understanding of my invention reference will be made to the following specific examples which are set forth primarily for illustrating specific embodiments of my invention.

Example I

One mole part of crude gentisic acid is dissolved in an aqueous solution of 2.2 mole parts of sodium hydroxide in the presence of zinc dust. The solution is filtered and, in the presence of fresh zinc dust, 1.2 mole parts of acetic anhydride are stirred in at 10–12° C. The mixture at this point is a sodium salt solution of gentisic acid monoacetate plus zinc dust. After several minutes' stirring with decolorizing charcoal it is filtered into a flask containing a small amount of zinc dust. The filtrate at this point is acidified to a pH of 2 with hydrochloric acid, while keeping the temperature below 20° C., in order to release the gentisic acid monoacetate. This gentisic acid monoacetate is separated by filtration, the resultant filter cake is washed with cold water then boiled in dilute hydrochloric acid to hydrolyze the acetate. The holt solution of zinc dust and hydrolyzed gentisic acid acetate is treated with decolorizing charcoal, filtered, and the filtrate is cooled to effect crystallization. The gentisic acid thus obtained is separated by filtration at 5–10° C., washed with water and dried by conventional means to give white, high quality product. Material made thus appears to be quite stable after three years storage.

Example II

Crude gentisic acid (10 grams), sodium hydroxide (5.7 grams) and zinc dust (1 gram) are warmed in 100 ml. of water and filtered, 50 ml. of wash water being used. A pinch of zinc dust is added to the filtrate and wash, then 8.4 grams of 97% acetic anhydride are stirred in while holding the temperature between 10–12° C. The mix is stirred a few minutes with 1 gram of Nuchar then refiltered into a flask containing a pinch of zinc dust, 50 ml. of wash water again being used. Then, while keeping the temperature below 20° C., concentrated hydrochloric acid is stirred into the solution to adjust the pH at 2 and the resultant slurry is filtered at 10° C., the cake being washed with 100 ml. of cold water then sucked as dry as possible. The wet cake is boiled in a solution of 8 ml. hydrochloric acid and 42 ml. water, the solution is decolorized with 1 gram of Nuchar and filtered hot with the charcoal cake being washed with 10 ml. of hot water. The last filtrate and wash, after cooling to effect crystallization, is filtered at 5–10° C. and the product cake is washed with 25 ml. of cold water, then oven dried. Physical data on the experiment are as follows:

Yield—76%
Color of gentisic acid—white
Melting point (corr.)—202–202.7° C.

*Example III*

Part A.—Crude gentisic acid (15.4 grams) is mixed with 97.8% acetic anhydride (10.4 grams) then 3 drops of concentrated sulfuric acid are stirred in and the mixture is warmed to give a homogeneous melt which in turn is stirred into 200 ml. of water. The resultant slurry is heated to effect solution, then cooled and filtered at 30° C. The filter cake is washed with 300 ml. of cold water and dried to give 15.0 grams (76.5% yield) of gentisic acid monoacetate of 128–130° C. (corr.) melting point.

Part B.—Gentisic acid monoacetate (10 grams) is stirred at the boiling temperature in a mixture of 50 ml. water and 5 ml. concentrated hydrochloric acid. Decolorization of this boiling solution is effected with 1 gram of Nuchar and 1 gram of zinc dust followed by filtration. The filtrate is cooled to 10° C. with stirring and refiltered. The product cake is washed with 25 ml. of cold water and dried to give 6.6 grams (84% yield) of white gentisic acid of 203.3–204.3° C. (corr.) melting point. Overall recovery from crude gentisic acid (Parts 1 and 2) is 64.2%.

It is believed that it may be seen from the above disclosure that I have provided a relatively simple but effective method by which excellent gentisic acid and derivatives may be obtained. That is, the purified gentisic acid ester, if desired, rather than the acid may be isolated and used. While I have shown the recrystallization of the gentisic products from aqueous solution, such recrystallization may also be accomplished from organic solution, such as benzene solution. As apparent, such use of solvent distinguishes from prior art extraction aforementioned.

"Nuchar" according to the Handbook of Material Trade Names by Limmerman and Lavine, is an activated carbon made from a residual organic material obtained in the manufacture of cellulose, and is a trade name of the West Virginia Pulp & Paper Co.

In the above examples I employed zinc merely to maintain a reducing environment. In place of zinc dust other additives for obtaining reducing conditions can be employed, such as iron dust, tin metal, sulfur dioxide and the like.

While I prefer to use acetic anhydride for producing the monoacetate of gentisic acid, other acetylating media, such as acetyl chloride, may be employed.

Although I prefer to use an acetylating temperature of 5–20° C. when the acetylation is carried out in aqueous alkali solution, temperatures within the range of 0–50° C. may be employed, the only limitation being that the temperature should preferably be below that at which a significant amount of hydrolysis of the acetylating agent or the product ester takes place. When the acetylation is carried out under anhydrous conditions, such as described in Example IIIA above, temperatures within the range of 0–150° C. may be satisfactorily employed.

In Examples I and II above, in the treatment of the filtered liquid containing the gentisic acid acetate sodium salt with an inorganic acid, I maintained a temperature of below 20° C. in order to completely suppress hydrolysis of the acetate. It should be understood that in practice any temperature at which no significant amount of acetate is hydrolyzed may be conveniently used, such as 0–50° C.

In place of the filtering steps, centrifuging or the like separatory procedures may be employed. As suggested above, other changes may be made in my process, such as purification of gentisic acid acetate by recrystallization from solvents such as benzene and the like.

The resultant purified gentisic acid produced by my invention has very excellent color and is of a quality rendering it suitable for use for all purposes for which gentisic acid has heretofore been used.

I claim:

1. The process of purifying crude gentisic acid which has yellow coloration due to the presence of contaminating amounts of 2,5-dihydroxy terephthalic acid, which comprises preparing an aqueous sodium hydroxide solution of said crude gentisic acid, providing a reducing environment in said aqueous solution by incorporating a small amount of zinc dust, treating aqueous solution as aforesaid containing crude gentisic acid with acetic anhydride and with agitation, while holding the temperature thereof at about 10–12° C., whereby the gentisic acid is converted into a monoacetate derivative, subjecting the liquid containing the sodium salt of the gentisic acid monoacetate to treatment with a decolorizing carbon, then filtering the liquid containing said sodium salt of gentisic acid monoacetate to remove the decolorizing carbon therefrom, treating the separated gentisic acid monoacetate sodium salt solution with inorganic acid at a solution temperature below 20° C. to produce a slurry of insoluble gentisic acid monoacetate, having a pH of about 2, then separating the gentisic acid monoacetate from the slurry to obtain a cake thereof, boiling the cake with an aqueous solution of an inorganic acid in the presence of decolorizing charcoal to liberate the gentisic acid from the monoacetate, subjecting the slurry resulting from the steps just referred to to a separatory treatment whereby the decolorizing charcoal is removed, and then cooling the clarified liquid to cause crystallization therefrom of purified gentisic acid crystals, further washing and then drying said purified gentisic acid.

2. The process of purifying crude gentistic acid which has yellow coloration due to the presence of contaminating amounts of 2,5-dihydroxy terephthalic acid, which comprises preparing an aqueous sodium hydroxide solution of said crude gentisic acid, providing a reducing environment in said aqueous solution and acetylating the sodium salt solution of the gentisic acid by incorporating an acetylating agent from the group consisting of acetic anhydride and acetyl chloride therein with agitation while maintaining the temperature within the range of 0–50° C., and below that at which a significant amount of hydrolysis of the acetylating agent and the product ester takes place, whereby the gentisic acid is converted into the monoacetate derivative of the sodium salt of the gentisic acid, subjecting this liquid containing this sodium salt of gentisic acid monoacetate in aqueous environment to treatment wth a decolorizing carbon, separating the carbon from the treated solution containing said derivative, then treating such solution with hydrochloric acid while keeping the temperature below 20° C. whereby the insoluble gentisic acid monoacetate is released from the aforementioned sodium salt derivative, separating and washing this gentisic acid monoacetate, then boiling this insoluble product with aqueous hydrochloric acid whereby this insoluble product is hydrolyzed to give a solution of gentisic acid, treating the solution with decolorized carbon, separating the carbon from the solution containing the gentisic acid and then cooling the solution to cause crystallization therefrom of purified gentisic acid crystals, washing and drying said purified crystals.

3. The process in accordance with claim 2 wherein acetic anhydride is used as the acetylating agent and the temperature of the acetylating agent is held within the range of 5–20° C.

References Cited in the file of this patent

UNITED STATES PATENTS

| | | |
|---|---|---|
| 2,569,440 | Agnew et al. | Oct. 2, 1951 |
| 2,588,679 | Williams et al. | Mar. 11, 1952 |
| 2,715,644 | Wright et al. | Aug. 16, 1055 |
| 2,733,266 | McKinnis | Jan. 31, 1956 |